Jan. 30, 1962 J. J. SEMOES 3,018,833
CULTIVATOR
Filed June 3, 1960 2 Sheets-Sheet 2
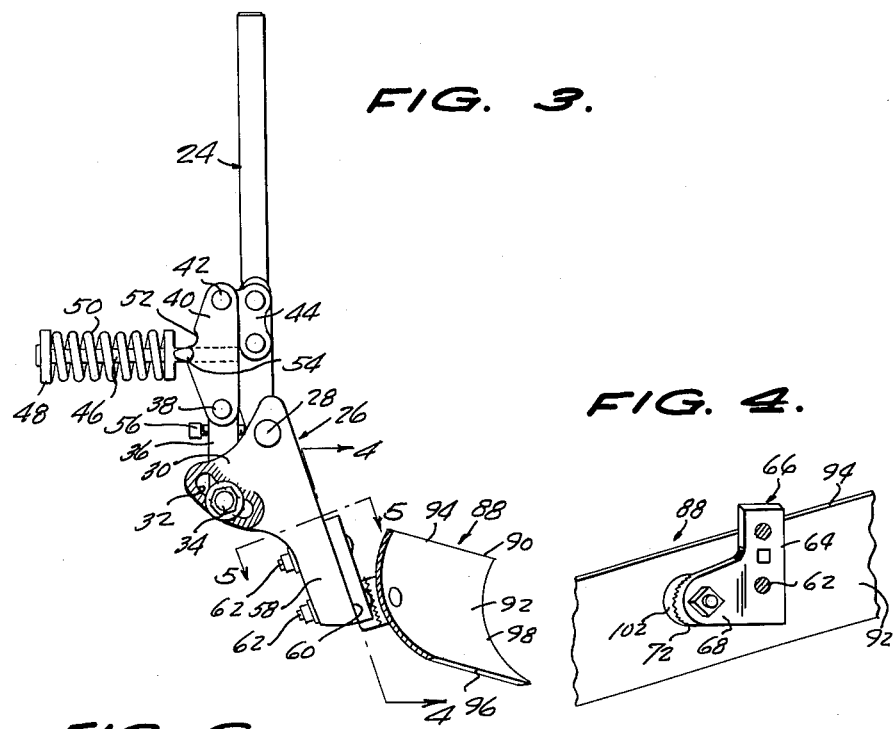
FIG. 3.
FIG. 4.
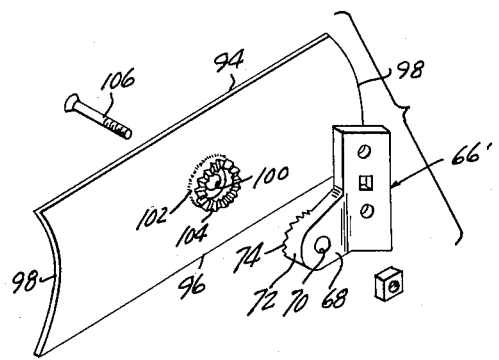
FIG. 6.
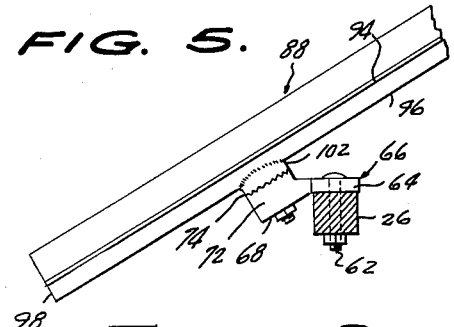
FIG. 5.
FIG. 7.
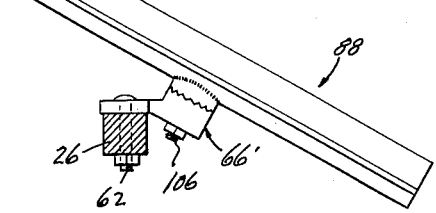
FIG. 8.
INVENTOR.
JOHN J. SEMOES,
BY
McMorrow, Berman & Davidson
ATTORNEYS.

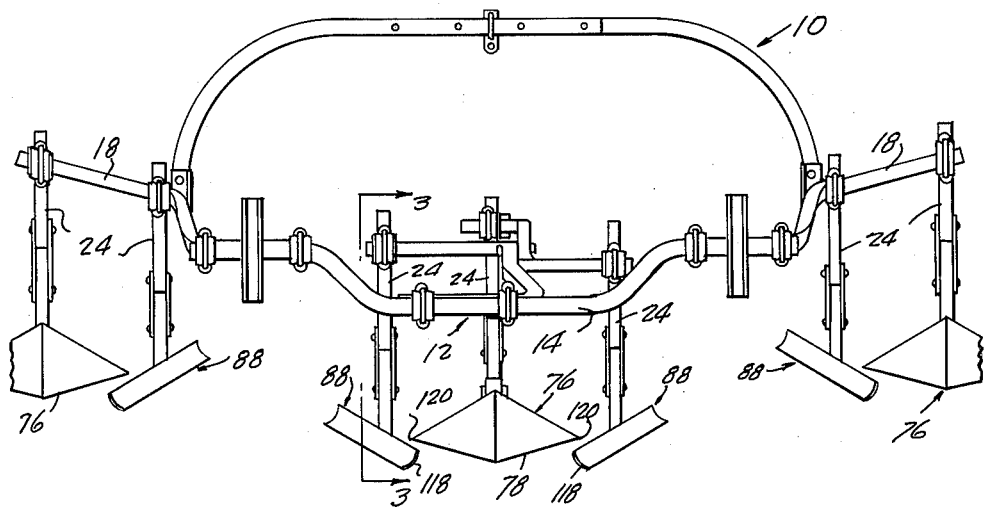
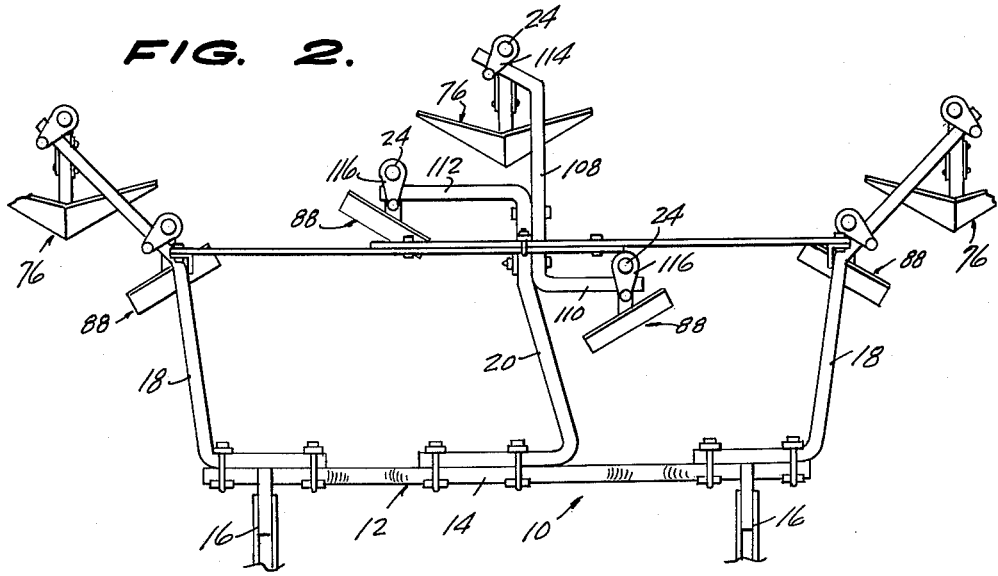

United States Patent Office 3,018,833
Patented Jan. 30, 1962

3,018,833
CULTIVATOR
John J. Semoes, 5951 Ave. 236, Tulare, Calif.
Filed June 3, 1960, Ser. No. 33,709
6 Claims. (Cl. 172—159)

This invention relates to improvements in cultivators, and more particularly to furrow edging attachments for cultivators which precede and are located at opposite sides of the sweeps thereof.

The primary object of the invention is to provide attachments of the kind indicated which have lower edges which are angled rearwardly and upwardly relative to the horizontal, and which can reach, at their inward ends, below the planes of the bottoms of the sweeps, so as to produce, in conjunction with the sweeps, furrows of greater depth than can be produced by sweeps alone, or higher rows, at opposite sides of the furrows, with better weed control in the furrows.

Another object of the invention is the provision of an assembly which includes a conventional sweep, and edger blades located at opposite sides of the sweep and preceding the sweep, which produce higher rows at opposite sides of a furrow, the resultant greater furrow depth enabling pickers, as of cotton, to reach and pick from plants growing in the rows, at a lower level than otherwise practical.

A further object of the invention is to provide assemblies of the character indicated above, wherein the blades are double-edged, and are reversible; and which are adjustable as to angle and are readily replaceable when both edges are worn.

Other important objects and advantageous features of the invention will be apparent from the following description and the accompanying drawings, wherein, for purposes of illustration only, a specific form of the invention is set forth in detail.

In the drawings:

FIGURE 1 is a front perspective view of a cultivator equipped with assemblies of the present invention.

FIGURE 2 is a top plan view of FIGURE 1.

FIGURE 3 is an enlarged side elevation taken from the line 3—3 of FIGURE 1.

FIGURE 4 is a fragmentary perspective view, partly in section, showing a blade and its adjustable mounting bracket.

FIGURE 5 is a horizontal section taken on the line 5—5 of FIGURE 3.

FIGURE 6 is an exploded perspective view of FIGURE 4.

FIGURE 7 is a view, like FIGURE 5, of a reversed blade.

FIGURE 8 is a perspective view of a blade mounting bracket.

Referring in detail to the drawings, wherein like numerals indicate like parts throughout the several views, there is shown a substantially conventional tractor-drawn cultivator frame, generally designated 10, comprising a rearwardly opening, horizontal, U-shaped component 12, having a transverse portion 14 on which are secured forwardly extending draw bars 16, and rearwardly divergent outer arms 18 on the ends of the portion 14. Mounted on the middle of the transverse portion 14 and extending rearwardly therefrom is an intermediate arm 20.

As shown in FIGURE 3, mounting shanks 26 are pivoted at their upper ends, as indicated at 28, on rigid vertical bars 24 and have extending rearwardly therefrom flanges 30 having arcuate slots 32 therein, through which extend clamping bolts 34. The bolts 34 are anchored in the lower parts of lower vertical levers 36 which are pivoted at their upper ends, as indicated at 38, to the lower ends of upper vertical levers 40 which are pivoted at their upper ends, as indicated at 42, behind the bars 24, on portions of brackets 44 secured to the bars 24. Rigid horizontal rods 46 are fixed to and extend rearwardly from the bars 24, midway between the ends of the upper levers 40, and have enlarged heads 48 on their rear ends. Helical springs 50 are circumposed on the rods 46 and are compressed between the heads 48 and the upper levers 40, the levers 40 having notches 52 in which lugs 54, on the forward ends of the springs 50, are selectively engageable. The lower levers 36 have stop screws 56 extending forwardly therethrough for adjustable stop engagements with the rear sides of the bars 24, for holding the shanks 26 in desired angular relationships to the bars 24.

The shanks 26 have forwardly and downwardly angled lower portions 58 having flat forward surfaces 60, against which are bolted, as indicated at 62, the standards 64 of L-shaped mounting brackets 66, which have laterally extending foot portions 68, formed with openings 70. The foot portions 68 are, as shown in FIGURES 5 and 7, angled inwardly and rearwardly relative to the standard portions 64. Bosses 72 on the forward sides of the foot portions have concentric circles of teeth 74 thereon.

The shanks 26 carry either conventional triangular or pyramidal sweeps 76 or brackets 66 for edger blades 88. The edger blades 88 comprise horizontally elongated convex-concave plates 90 having forwardly facing concave sides 92, parallel upper and lower straight edges 94 and 96, respectively, and squared ends 98. Formed centrally in the blades, and preferably slightly above the middle heights thereof, are openings 100, surrounded by hollow bosses 102, which project from the rear convex sides 92, and which have concentric circles of teeth 104 on their forward ends. The blades 88 are mounted on the brackets 66, with the two sets of teeth 74 and 104 engaged, by means of bolts 106 which extend through the blade and bracket openings 100 and 70.

The teeth 74 and 104 and the bolts 106 enable reversing the blades 88 on the shanks 26 so as to present unworn edges downwardly and forwardly to the ground. Similar but reversed brackets are used on the shanks 26 to support the blades on shanks located at opposite sides of the sweeps 76, as indicated at 66 and 66' in FIGURES 5 and 7, respectively.

As shown in FIGURES 1 and 2, and with regard to the intermediate cultivator frame arm 20, the intermediate arm 20 has secured to a side thereof the intermediate part of a supplemental arm 108 which extends rearwardly beyond the cultivator frame 10, and has a forward laterally extending portion 110 on its forward end. An oppositely laterally extending portion 112 on the rear end of the arm 20 is located between the rear end of the arm 108 and the portion 110. Mounted on the rear end of the arm 108, as indicated at 114, is a bar 24 on which is mounted, as described above, a shank 26 which carries a conventional sweep 76. Mounted on the outer ends of the lateral portions 110 and 112, as indicated at 116, are bars 24 on which are mounted shanks 26 which carry edger blades 88, with the inner ends 118 of the blades extending inwardly slightly beyond the related ends 120 of the sweep 76, the blades 88 being angled inwardly and forwardly relative to the sweep 76, and disposed in forwardly declining planes, with their lower edges 96 on a level below the flat bottom 78 of the sweep 76.

The outer cultivator frame arms 18, as shown in FIGURES 1 and 2, carry similar assemblies of sweeps 76 and edger blades 88.

In operation, the cultivator frame 10 being drawn forwardly over the ground, the edge blades 88 dig into the ground, at their inner ends, so that earth piles up in front of the blades and is pushed laterally outwardly and rearwardly along the blades. At the same time, the lower edges 96 of the blades, being canted upwardly and laterally outwardly, and rearwardly, form high angled furrow sides or row sides. The ground between the blades 88 remains relatively undisturbed, except at the inner ends of the blades, until reached by the sweeps 76, whereat the sweeps dig up earth and move the same laterally outwardly and upwardly so as to finally form the furrow sides, the earth loosened by and at the inner ends of the blades 88 being thus more readily handled and distributed by the sweeps 76, so that higher than normal rows, equivalent to deeper than normal furrows, are produced, than can be obtained by the use of sweeps alone.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In a cultivator, a frame having a transverse portion, an intermediate arm fixed to and extending rearwardly from said transverse portion, a first lateral member on the rear end of said intermediate arm, a supplemental arm extending along said intermediate arm and fixed intermediate its ends to said intermediate arm, said supplemental arm having a second lateral member on its forward end extending in a direction opposite to said first lateral member, said second member being spaced forwardly from said first member, a sweep mounted on and extending downwardly from the rear end of said supplemental arm behind said first lateral member, and vertical bars secured to and extending downwardly from said first and second members and carrying edger blades, the blades being located at opposite sides of the vertical center line of said sweep.

2. In a cultivator, a frame having a transverse portion, an intermediate arm fixed to and extending rearwardly from said transverse portion, a first lateral member on the rear end of said intermediate arm, a supplemental arm extending along said intermediate arm, and fixed intermediate its ends to said intermediate arm, said supplemental arm having a second lateral member on its forward end extending in a direction opposite to said first lateral member, said second member being spaced forwardly from said first member, a sweep mounted on and extending downwardly from the rear end of said supplemental arm behind said first lateral member, and vertical bars secured to and extending downwardly from said first and second members and carrying edger blades, the blades being located at opposite sides of the vertical center line of said sweep, the inward ends and portions of the lower edges of the blades being below said sweep.

3. In a cultivator, a frame having a transverse portion, an intermediate arm fixed to and extending rearwardly from said transverse portion, a first lateral member on the rear end of said intermediate arm, a supplemental arm extending along said intermediate arm, and fixed intermediate its ends to said intermediate arm, said supplemental arm having a second lateral member on its forward end extending in a direction opposite to said first lateral member, said second member being spaced forwardly from said first member, a sweep mounted on and extending downwardly from the rear end of said supplemental arm behind said first lateral member, and vertical bars secured to and extending downwardly from said first and second members and carrying edger blades, the blades being located at opposite sides of the vertical center line of said sweep, the inward ends and portions of the lower edges of the blades being below said sweep, said inward ends of the blades being located inwardly of related ends of the sweep.

4. In a cultivator, a frame having a transverse portion, an intermediate arm fixed to and extending rearwardly from said transverse portion, a first lateral member on the rear end of said intermediate arm, a supplemental arm extending along said intermediate arm, and fixed intermediate its ends to said intermediate arm, said supplemental arm having a second lateral member on its forward end extending in a direction opposite to said first lateral member, said second member being spaced forwardly from said first member, a sweep mounted on and extending downwardly from the rear end of said supplemental arm behind said first lateral member, and vertical bars secured to and extending downwardly from said first and second members and carrying edger blades, the blades being located at opposite sides of the vertical center line of said sweep, the inward ends and portions of the lower edges of the blades being below said sweep, said inward ends of the blades being located inwardly of related ends of said sweep, said blades being horizontally elongated and having concave forward surfaces and convex rear surfaces, and means mounting the edger blades on the vertical bars at points intermediate the ends of the blades.

5. In a cultivator, a frame having a transverse portion, an intermediate arm fixed to and extending rearwardly from said transverse portion, a first lateral member on the rear end of said intermediate arm, a supplemental arm extending along said intermediate arm, and fixed intermediate its ends to said intermediate arm, said supplemental arm having a second lateral member on its forward end extending in a direction opposite to said first lateral member, said second member being spaced forwardly from said first member, a sweep mounted on and extending downwardly from the rear end of said supplemental arm behind said first lateral member, and vertical bars secured to and extending downwardly from said first and second members and carrying edger blades, the blades being located at opposite sides of the vertical center line of said sweep, the inward ends and portions of the lower edges of the blades being below said sweep, said inward ends of the blades being located inwardly of related ends of said sweep, said blades being horizontally elongated and having concave forward surfaces and convex rear surfaces, and means mounting the edger blades on the vertical bars at points intermediate the ends of the blades, said means comprising shanks mounted on the vertical bars at the lower ends of the bars, said shanks having downwardly angled forward faces, brackets fixed on said forward faces and secured to the edger blades at their convex rear sides, brackets being L-shaped and having vertical standards fixed to the forward faces of the shanks and laterally extending foot portions, and means rotatably and securably connecting the blades to said foot portions.

6. In a cultivator, a frame having a transverse portion, an intermediate arm fixed to and extending rearwardly from said transverse portion, a first lateral member on the rear end of said intermediate arm, a supplemental arm extending along said intermediate arm, and fixed intermediate its ends to said intermediate arm, said supplemental arm having a second lateral member on its forward end extending in a direction opposite to said first lateral member, said second member being spaced forwardly from said first member, a sweep mounted on and extending downwardly from the rear end of said supplemental arm behind said first lateral member, and vertical bars secured to and extending downwardly from said first and second members and carrying edger blades, the blades being located at opposite sides of the vertical center line of said sweep, the inward ends and portions of the lower edges of the blades being below said sweep, said inward ends of the blades being located inwardly of related ends of said sweep, said blades being horizontally elongated and having concave forward surfaces and convex rear surfaces, and means mounting the edger blades on the vertical bars at points intermediate the ends of the blades, said means comprising shanks mounted on the vertical bars at the lower ends of the bars, said shanks having downwardly angled forward faces, brackets fixed on said forward faces and secured to the edger blades at their convex rear sides, brackets being L-shaped and having vertical standards fixed to the forward faces of the shanks and laterally extending foot portions, and means rotatably and securably connecting the blades to said foot portions, said connecting means comprising toothed bosses on said foot portions, toothed bosses on the rear sides of the edger blades, the teeth of the bosses being interengaged, and bolts extending through the bosses.

References Cited in the file of this patent

UNITED STATES PATENTS

| | | |
|---|---|---|
| 51,055 | Ingraham | Nov. 21, 1865 |
| 226,641 | Wansbrough et al. | Apr. 20, 1880 |
| 306,219 | Christman | Oct. 7, 1884 |
| 367,684 | Van | Aug. 2, 1887 |
| 692,127 | Ezell | Jan. 28, 1902 |
| 1,744,910 | Mariner | Jan. 28, 1930 |
| 2,522,702 | Charley | Sept. 19, 1950 |